(12) United States Patent
Nam et al.

(10) Patent No.: US 11,541,946 B2
(45) Date of Patent: Jan. 3, 2023

(54) TRANSMISSION MOUNT OF REAR WHEEL DRIVE VEHICLE

(71) Applicants: Hyundai Motor Company, Seoul (KR); Kia Motors Corporation, Seoul (KR)

(72) Inventors: Youn Sic Nam, Daejeon (KR); Yun Su Jung, Suwon-Si (KR); Jun Haeng Heo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 509 days.

(21) Appl. No.: 16/660,462

(22) Filed: Oct. 22, 2019

(65) Prior Publication Data

US 2020/0172172 A1    Jun. 4, 2020

(30) Foreign Application Priority Data

Dec. 4, 2018    (KR) .................. 10-2018-0154112

(51) Int. Cl.
| | |
|---|---|
| *B62D 27/02* | (2006.01) |
| *B60K 6/54* | (2007.10) |
| *B60K 17/08* | (2006.01) |
| *B60K 17/00* | (2006.01) |

(52) U.S. Cl.
CPC .............. *B62D 27/023* (2013.01); *B60K 6/54* (2013.01); *B60K 17/00* (2013.01); *B60K 17/08* (2013.01)

(58) Field of Classification Search
CPC ........ B60K 17/06; B60K 17/00; B60K 17/08; B60K 5/12; B62D 27/023; B62D 21/02; B62D 21/03; B62D 21/10; B62D 21/11; B62D 25/20; B60R 2021/0004; B60Y 2306/09; B60Y 2306/01
USPC ................ 180/219, 292, 293, 295, 124, 109
See application file for complete search history.

(56) References Cited

U.S. PATENT DOCUMENTS

| | | | | |
|---|---|---|---|---|
| 5,593,001 A * | 1/1997 | Takano | ................ | B60K 17/00 180/312 |
| 8,215,442 B2 * | 7/2012 | Ishii | ........................ | B60K 5/12 180/291 |
| 8,651,217 B2 * | 2/2014 | Kim | ...................... | B62D 21/11 267/140.3 |
| 9,150,250 B2 * | 10/2015 | Imanishi | ................ | B62D 21/11 |
| 9,383,059 B2 * | 7/2016 | Kappich | .............. | B60K 5/1216 |
| 9,776,662 B2 * | 10/2017 | Hirano | ................... | B62D 21/11 |
| 9,816,599 B2 * | 11/2017 | Compton | .............. | F16H 57/025 |
| 9,885,410 B2 * | 2/2018 | Rosendahl | .............. | F16F 15/08 |
| 10,208,825 B2 * | 2/2019 | Satou | ........................ | F16F 7/00 |
| 2007/0131469 A1 * | 6/2007 | Kim | ...................... | B60K 5/1241 180/293 |
| 2010/0237220 A1 * | 9/2010 | Grun | .................... | B60K 5/1208 248/573 |

(Continued)

FOREIGN PATENT DOCUMENTS

| | | |
|---|---|---|
| CN | 202413408 U | 9/2012 |
| CN | 204196700 U | 3/2015 |

(Continued)

*Primary Examiner* — Paul N Dickson
*Assistant Examiner* — Tiffany L Webb
(74) *Attorney, Agent, or Firm* — Morgan, Lewis & Bockius LLP

(57) ABSTRACT

A transmission mount of a rear wheel drive vehicle may increase both vibrational noise performance and collision performance of the vehicle.

11 Claims, 4 Drawing Sheets

(56) References Cited

U.S. PATENT DOCUMENTS

2012/0285764 A1\*  11/2012  Compton ............... B62D 21/02
                                                180/312
2016/0152272 A1\*  6/2016  Tomikuda .............. B62D 21/02
                                                296/203.01

FOREIGN PATENT DOCUMENTS

| JP | H11-153177 A | 6/1999 |
| JP | 2000-001126 A | 1/2000 |
| JP | 2000-272356 A | 10/2000 |
| JP | 2007-015630 A | 1/2007 |
| JP | 2007-272356 A | 10/2007 |
| KR | 10-0610111 B1 | 8/2006 |

\* cited by examiner

A-A CROSS SECTION

B-B CROSS SECTION

TRANSMISSION MOUNT OF REAR WHEEL DRIVE VEHICLE

CROSS-REFERENCE TO RELATED APPLICATION

The present application claims priority to Korean Patent Application No. 10-2018-0154112 filed on Dec. 4, 2018, the entire contents of which is incorporated herein for all purposes by this reference.

BACKGROUND OF THE INVENTION

Field of the Invention

The present invention relates to a transmission mount. More particularly, it relates to a transmission mount of a rear wheel drive vehicle.

Description of Related art

In general, in a rear wheel drive vehicle, an engine is mounted in a front and rear direction and a transmission is connected to a rear portion of the engine. Therefore, an engine mount and a transmission mount are mounted to be separated from each other in the front and rear direction of the vehicle. The engine is supported by a vehicle body through the engine mount, and the transmission is supported by the vehicle body through the transmission mount.

The conventional transmission mount is mounted under the transmission, and bushings are mounted between the transmission and the transmission mount. The bushings reduce vibration and noise of the transmission during acceleration, and rigidity of the transmission mount influences vibrational noise performance of the bushings. In other words, rigidity of the transmission mount influences vibration and noise (noise due to vibration) of the transmission during acceleration. Therefore, it is necessary to secure vibrational noise performance of the bushings of the transmission by increasing rigidity of the transmission mount.

Furthermore, when head-on collision of the vehicle occurs, the engine may be moved back and thus deform a passenger compartment (the internal to the vehicle). Therefore, it is necessary to secure passenger's safety by minimizing deformation of the passenger compartment when head-on collision of the vehicle occurs. To minimize deformation of the passenger compartment when head-on collision of the vehicle occurs, the engine may be descended while being moved back.

However, if the transmission mount is not ruptured when head-on collision of the vehicle occurs, the engine is moved back, the transmission is rotated, and a propeller shaft is bent upwards and may thus increase passenger injuries. Therefore, the transmission mount needs to have a small enough strength to be ruptured by collision load.

Vibrational noise performance and collision performance are main performance factors of vehicles, but the two performances conflict with each other in terms of rigidity of the transmission mount and thus it is difficult to simultaneously secure the two performances.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission mount of a rear wheel drive vehicle which may increase both vibrational noise performance and collision performance of the vehicle.

Various aspects of the present invention are directed to providing a transmission mount of a rear wheel drive vehicle, mounted under a transmission with bushings between the transmission mount and the transmission to reduce vibration of the transmission, the transmission mount including a central unit configured to be mounted under the bushings to support the transmission, and side units extending from both side edges of the central unit and configured to be combined with a vehicle body, wherein each of the side units may include a plurality of leg portions formed in a longitudinal direction of the central unit.

In an exemplary embodiment of the present invention, a space may be formed between neighboring leg portions of the side units.

In another exemplary embodiment of the present invention, mount holes for combination of the transmission mount with the vehicle body may be formed at an end portion in each of the plurality of leg portions.

In yet another exemplary embodiment of the present invention, the plurality of leg portions may include a side horizontal plane portion extending in a longitudinal direction of the central unit and a side vertical plane portion extending downwards from the edge portion of the side horizontal plane portion, and thus have a rectangular cross-sectional structure with a bottom side open.

In yet another exemplary embodiment of the present invention, the central unit may include a central horizontal plane portion extending in the longitudinal direction of the central unit and a central vertical plane portion extending downwards from the edge portion of the central horizontal plane portion, and thus have a rectangular cross-sectional structure with a bottom side open.

In still yet another exemplary embodiment of the present invention, a height of the central vertical plane portion may be greater than a height of the side vertical plane portion by a designated value or more.

The methods and apparatuses of the present invention have other features and advantages which will be apparent from or are set forth in more detail in the accompanying drawings, which are incorporated herein, and the following Detailed Description, which together serve to explain certain principles of the present invention.

Other aspects and exemplary embodiments of the present invention are discussed infra.

The above and other features of the present invention are discussed infra.

Figure 1:
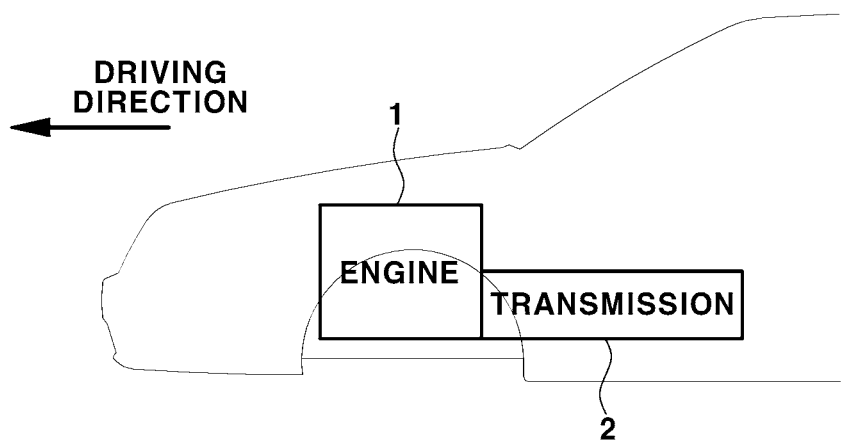
FIG. 1 is a view exemplarily illustrating an arrangement structure of an engine and a transmission of a rear wheel drive vehicle.

It may be understood that the appended drawings are not necessarily to scale, presenting a somewhat simplified representation of various exemplary features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

As exemplarily shown in FIG. 1, an engine 1 of a rear wheel drive vehicle is mounted in an engine compartment mounted at a front region of the vehicle, and a transmission 2 is connected to a rear portion of the engine 1. The engine 1 is combined with a vehicle body by an engine mount, and the transmission 2 is supported by the vehicle body through a transmission mount.

Figure 2:
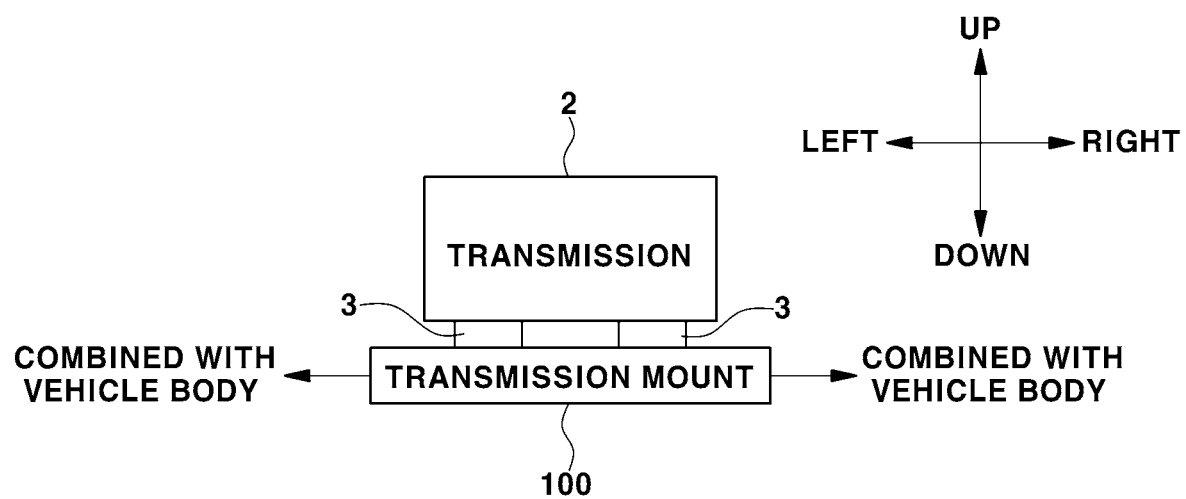
FIG. 2 is a view exemplarily illustrating an arrangement structure of bushings and a transmission mount mounted under the transmission.

As exemplarily shown in FIG. 2, the transmission mount 100 is mounted under the transmission 2 under the condition that both end portions of the transmission mount 100 are combined with the vehicle body, and bushings 3 to reduce vibration of the transmission 2 are mounted between the transmission mount 100 and the transmission 2. The bushings 3 are fixedly mounted at the lower end portion of the transmission 2, and are supported by the transmission mount 100.

That is, the transmission mount 100 is mounted under the transmission 2 by interposing the bushings 3 between the transmission mount 100 and the transmission 2, and the bushings 3 are deformed under the condition that the lower surfaces of the bushings 3 are supported by the transmission mount 100, and absorb vibration of the transmission 2. The bushings 3 may be rubber bushings which may be elastically deformed by vibration load of the transmission 2 and absorb vibration of the transmission 2.

Figure 3:
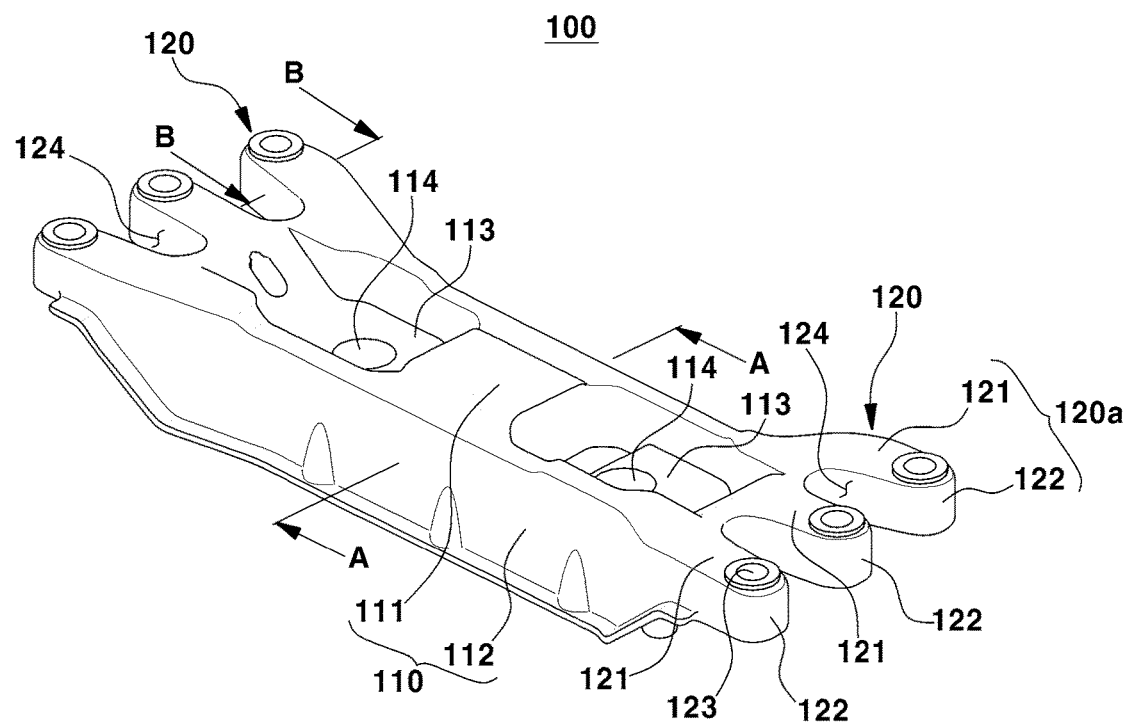
FIG. 3 is a perspective view of a transmission mount in accordance with various aspects of the present invention.

The transmission mount 100 of the rear wheel drive vehicle in accordance with various aspects of the present invention is a mount bracket which is mounted under the transmission 2 by interposing the above-described bushings 3 between the mount bracket and the transmission 2. As exemplarily shown in FIG. 3 and FIG. 4, the transmission mount 100 may include a central unit 110 and side units 120.

Figure 7:
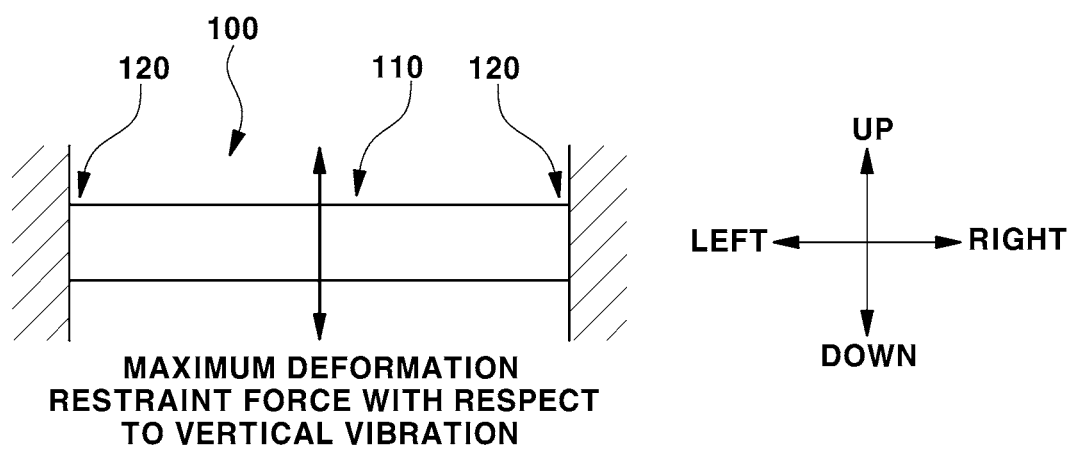
FIG. 7 is a view exemplarily illustrating deformation restraint force (inertial force) of a central unit with respect to vibration load applied to the transmission mount.
Figure 8:
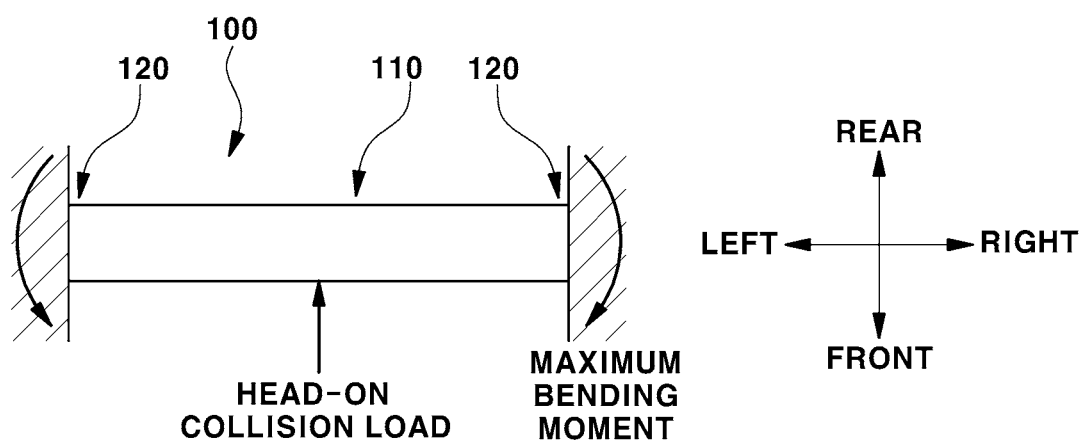
FIG. 8 is a view exemplarily illustrating bending moment of side units with respect to head-on collision load applied to the transmission mount.

The central unit 110 is mounted under the bushings 3 to support the transmission 2 and the bushings 3, is connected to the transmission 2 through the bushings 3, and receives vibration load applied downwards due to vibration of the transmission 2 (with reference to FIG. 7).

To allow the bushings 3 to normally absorb vibration of the transmission 2, it is necessary to minimize deformation of the central unit 110 with respect to the vibration load. Furthermore, to minimize deformation of the central unit 110 with respect to the vibration load, it is necessary to increase inertial force of the central unit 110 which maintains a current state without deformation due to the vibration load.

Figure 5:
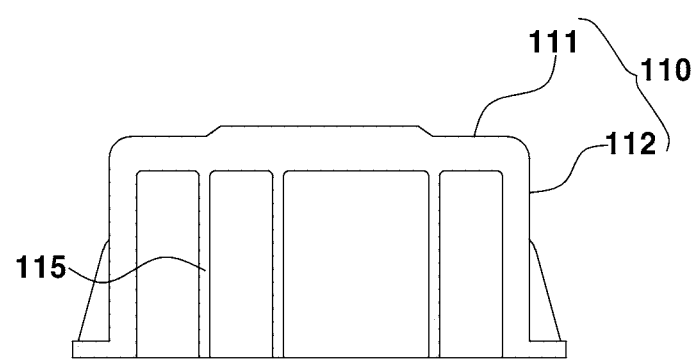
FIG. 5 is a cross-sectional view of FIG. 3 taken along line A-A, in which central reinforcing ribs are omitted.

The central unit 110 is a unit to which vibration of the transmission 2 is primarily input through the bushings 3, and may include a central horizontal plane portion 111 extending in a left and right direction of the vehicle body and in a horizontal direction and a central vertical plane portion 112 extending in an up and down direction of the vehicle body and in a vertical direction thereof. The central vertical plane portion 112 may be formed by extending from the edge portion of the central horizontal plane portion 111 in the downward direction (the vertical direction). Such a central unit 110 is not a mass but may be a plate-type structure which is bent in a designated direction as needed, and the central unit 110 may have an about rectangular cross-sectional structure with a bottom side open (with reference to FIG. 5).

To reduce deformation of the central unit 110 with respect to vibration load of the transmission 2, the central unit 110 has a greater height than the height of the side units 120 by a designated value or more. In more detail, the height of the central vertical plane portion 112 of the central unit 110 is greater than the height of the side units 120 (i.e., the height of side vertical plane parts) by a designated value or more, based on the up and down direction of the vehicle body. That is, the height (the width in the up and down direction) of the central vertical plane portion 112 is greater than the height (the width in the up and down direction) of the side vertical plane portions 122 by a designated value or more. Therefore, the weight of the central unit 110 may be increased, as compared to the side units 120, and inertial force to restrain deformation of the central unit 110 may be increased by increasing the weight of the central unit 110.

Holding grooves 113 in which the bushings 3 mounted at the lower end portion of the transmission 2 are disposed may be formed at both end portions of the central horizontal plane portion 111. The holding grooves 113 may be formed by bending left and right regions of the central horizontal plane portion 111 downwardly into a recessed structure.

Through holes 114 may be formed at the holding grooves 113 formed at the left and right regions of the central horizontal plane portion 111 by perforating the central horizontal plane portion 111. The through holes 114 may be used to mount the bushings 3 at the lower end portion of the transmission 2. The through holes 114 may not be formed at the central region of the central unit 100 on which vibration load of the transmission 2 is concentrated.

Figure 4:
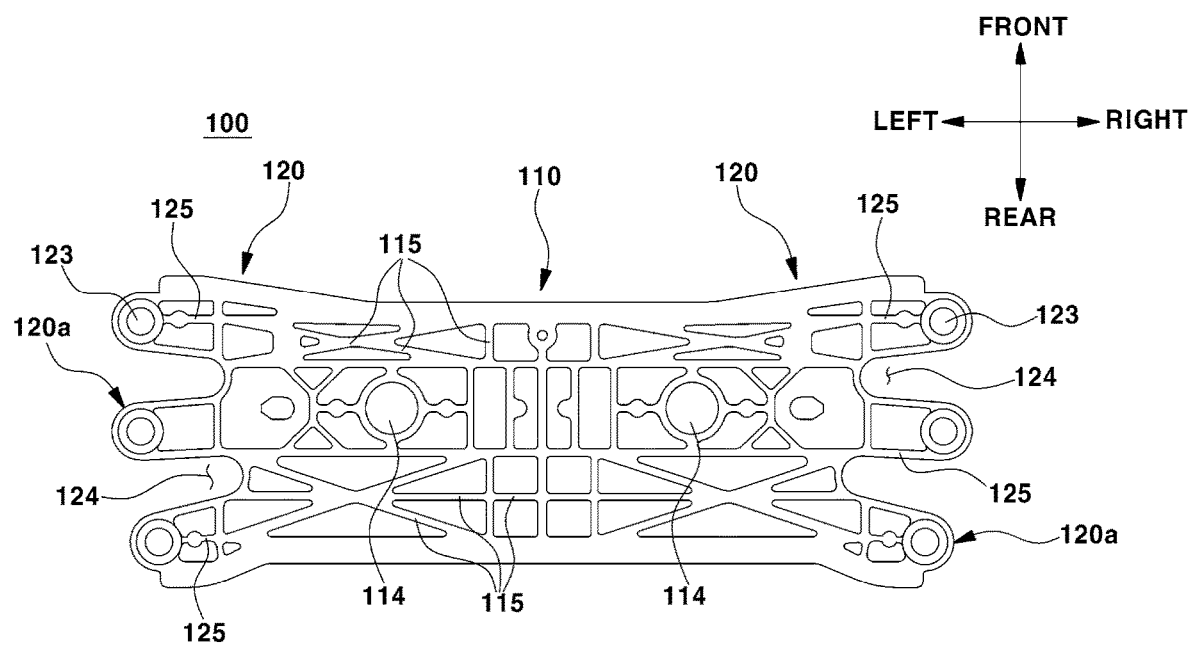
FIG. 4 is a bottom view of the transmission mount in accordance with various aspects of the present invention.

Furthermore, as exemplarily shown in FIG. 4, a plurality of central reinforcing ribs 115 may protrude from the bottom surface of the central horizontal plane portion 111. The plurality of central reinforcing ribs 115 may extend downwards from the bottom surface of the central horizontal plane portion 111. The plurality of central reinforcing ribs 115 may be formed as a diaphragm structure which extends without disconnection, to increase rigidity of the central unit 110 and simultaneously to minimize increase in the weight of the central unit 110.

The plurality of central reinforcing ribs 115 may be formed on the bottom surface of the central horizontal plane portion 111 to be bilaterally symmetrical.

Furthermore, the side units 120 are formed at both sides, i.e., left and right sides, of the central unit 110 and are combined with the vehicle body. The side units 120 extend from both sides edge portions of the central unit 110 in the left and right direction of the vehicle body.

When head-on collision of the vehicle occurs, the engine is moved back by collision load applied thereto in the front and rear direction thereof. Here, descending movement of the engine is promoted by inducing deformation and rupture of the side units 120, and thus deformation of a passenger compartment of the vehicle may be reduced.

The side units 120 are configured to minimize rupture strength thereof and to maximize bending moment thereof and, thus, to facilitate bending deformation of the side units 120 when head-on collision load is input to the transmission mount 100. To cause deformation and rupture of the side portions 120 due to collision load applied in the front and rear direction of the vehicle body, the side units 120 may include a plurality of leg portions 120a mounted in the front and rear direction of the vehicle body. If the side units 120 include the plurality of leg portions 120a which are subdivided from the side units 120, the volume of the side units 120 may be minimized and thus the bending moment of the side units 120 may be maximized.

Figure 6:
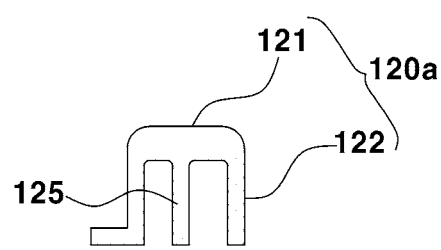
FIG. 6 is a cross-sectional view of FIG. 3 taken along line B-B, in which side reinforcing ribs are omitted.

The plurality of leg portions 120a may respectively extend from the left edge portion and the right edge portion of the central unit 110. In more detail, the plurality of leg portions 120a may include a side horizontal plane portion 121 extending in the left and right direction of the vehicle body and in the horizontal direction thereof, and a side vertical plane portion 122 extending in the up and down direction of the vehicle body and in the vertical direction thereof. The side vertical plane portion 122 may be formed by extending from the edge portion of the side horizontal plane portion 121 in the downward direction (the vertical direction). Such leg portions 120 are not masses but may be plate-type structures which are bent in a designated direction as needed, and the plurality of leg portions 120 may have an about rectangular cross-sectional structure with a bottom side open (with reference to FIG. 6).

Furthermore, a space 124 is formed between neighboring leg portions 120a of the side units 120. By forming the spaces 124, bending deformation of the plurality of leg portions 120a and rupture of the side units 120 due to collision load may be facilitated.

The plurality of leg portions 120 are bent and deformed in the front and rear direction thereof, when collision load is input to the transmission mount 100, and may thus minimize impact transmitted to the vehicle body and allow the engine to be descended.

In the side units 120 having the above configuration, the total width of the side units 120, acquired by summing the widths of the plurality of leg portions 120a disposed at the left side (or the right side) of the central unit 110 in the front and rear direction except for the spaces 124, may be less than the total width of the central unit 110 in the front and rear direction thereof, and the total width of the side units 120 including the widths of the spaces 124 and the plurality of leg portions 120a in the front and rear direction may be greater than the total width of the central unit 110 in the front and rear direction thereof.

The side units 120 may be combined with the vehicle body using mount holes 123 formed through the plurality of leg portions 120a. The mount holes 123 may be formed at the an end portion in each of the plurality of leg portions 120a which are close to the vehicle body. In more detail, the mount holes 123 may be formed at the end portions of the side horizontal plane portions 121.

Furthermore, a plurality of side reinforcing ribs 125 may protrude from the bottom surfaces of the side horizontal plane portions 121. The side reinforcing ribs 125 may extend downwards from the bottom surfaces of the side horizontal plane portions 121. The side reinforcing ribs 125 mounted at the left side of the central unit 110 and the side reinforcing ribs 125 mounted at the right side of the central unit 110 may be formed to be symmetrical with each other.

To induce deformation and rupture of the side units 120 when head-on collision of the vehicle occurs, strength of the side units 120 reinforced by the side reinforcing ribs 125 may be less than strength of the central unit 110.

Therefore, the side reinforcing ribs 125 may be formed on the bottom surface of the side horizontal plane portions 121, such that the weight per unit area of the side reinforcing ribs 125 formed on the bottom surfaces of the side horizontal plane portions 121 is less than the weight per unit area of the plurality of central reinforcing ribs 115 formed on the bottom surface of the central horizontal plane portion 111.

In the side units 120, if the plurality of leg portions 120a are bent, deformed and thus ruptured due to head-on collision load, a gap between the neighboring leg portions 120a may become wider and the side portions 120 may be ruptured, and even the central unit 110 may be ruptured according to the magnitude of collision load.

The transmission mount 100 having the above configuration may be deformed or ruptured due to collision load and thus increase collision performance of the vehicle when head-on collision of the vehicle occurs, and effectively reduce vibration and noise transmitted to the vehicle body when vibration of the transmission 2 occurs during acceleration.

As is apparent from the above description, a transmission mount of a rear wheel drive vehicle in accordance with various aspects of the present invention may have effects as follows.

First, the transmission mount may secure deformation restraint force of a central unit with respect to vibration transmitted from a transmission while driving. Therefore, deformation of the central unit due to vibration of the transmission occurring during acceleration is restrained and thus vibration reducing effects using transmission bushings may be increased.

Second, deformation and rupture of side units due to collision load generated when head-on collision of the vehicle occurs may be promoted. Therefore, when head-on collision of the vehicle occurs, the side units which are relatively weak are ruptured and thus collision performance of the vehicle may be increased. If the side units are ruptured, an engine of the vehicle, which is moved back toward a passenger compartment, may be descended.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transmission mount of a vehicle, mounted under a transmission with bushings located between the transmission mount and the transmission to reduce vibration of the transmission, the transmission mount comprising:
    a central unit configured to be mounted under the bushings to support the transmission; and
    side units formed at first and second sides of the central unit and configured to be combined with a vehicle body,
    wherein each of the side units includes a plurality of leg portions formed in a longitudinal direction of the central unit,
    wherein the central unit has a greater height than a height of the side units, and
    wherein the plurality of leg portions includes:
        a side horizontal plane portion extending in a longitudinal direction of the central unit and a side vertical plane portion extending downwards from an edge portion of the side horizontal plane portion to have a rectangular cross-sectional structure with a bottom side of the plurality of leg portions being open when the plurality of leg portions is cut along a direction perpendicular to the longitudinal direction of the central unit.

2. The transmission mount of claim 1, wherein a space is formed between adjacent leg portions among the plurality of leg portions of the side units.

3. The transmission mount of claim 1, wherein mount holes for combination of the transmission mount with the vehicle body are formed at an end portion in each of the plurality of leg portions.

4. The transmission mount of claim 1, wherein mount holes for combination of the transmission mount with the vehicle body are formed at an end portion in each of the plurality of leg portions.

5. The transmission mount of claim 1, wherein the central unit includes a central horizontal plane portion extending in the longitudinal direction of the central unit and a central vertical plane portion extending downwards from an edge portion of the central horizontal plane portion to have a rectangular cross-sectional structure with a bottom side of the central unit being open.

6. The transmission mount of claim 5, wherein a height of the central vertical plane portion is greater than a height of the side vertical plane portion by a predetermined value or more.

7. The transmission mount of claim 5, wherein holding grooves configured to receive the bushings mounted therein are formed at first and second end portions of the central horizontal plane portion.

8. The transmission mount of claim 5, wherein a plurality of central reinforcing ribs is formed on a bottom surface of the central horizontal plane portion.

9. The transmission mount of claim 8, wherein the plurality of central reinforcing ribs is formed on the bottom surface of the central horizontal plane portion to be bilaterally symmetrical.

10. The transmission mount of claim 8, wherein a plurality of side reinforcing ribs is formed on a bottom surface of the side horizontal plane portion of the plurality of leg portions.

11. The transmission mount of claim 10, wherein a weight per unit area of the plurality of side reinforcing ribs formed on the bottom surface of the side horizontal plane portion is less than a weight per unit area of the plurality of central reinforcing ribs formed on the bottom surface of the central horizontal plane portion by a predetermined value or more.

* * * * *